United States Patent
Margel et al.

(10) Patent No.: US 11,537,734 B2
(45) Date of Patent: *Dec. 27, 2022

(54) DETECTING ATTACKS ON DATABASES BASED ON TRANSACTION CHARACTERISTICS DETERMINED FROM ANALYZING DATABASE LOGS

(71) Applicant: Imperva, Inc., San Mateo, CA (US)

(72) Inventors: Shiri Margel, Petak Tikva (IL); Itsik Mantin, Shoham (IL); Guy Shtar, Ness Ziona (IL); Yury Geiler, Holon (IL)

(73) Assignee: Imperva, Inc., San Mateo, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/017,651

(22) Filed: Sep. 10, 2020

(65) Prior Publication Data

US 2020/0410128 A1    Dec. 31, 2020

Related U.S. Application Data

(63) Continuation of application No. 15/995,123, filed on May 31, 2018, now Pat. No. 10,803,192.

(Continued)

(51) Int. Cl.
*H04L 29/06*    (2006.01)
*G06F 21/62*    (2013.01)
*G06F 21/55*    (2013.01)

(52) U.S. Cl.
CPC ........ *G06F 21/6218* (2013.01); *G06F 21/554* (2013.01); *G06F 2221/034* (2013.01)

(58) Field of Classification Search
CPC .............. G06F 21/6218; G06F 21/554; G06F 2221/034
See application file for complete search history.

(56) References Cited

U.S. PATENT DOCUMENTS 6,230,271 B1 * 5/2001 Wadlow .............. H04L 63/0227
726/1
6,606,657 B1 8/2003 Zilberstein et al.
(Continued)

FOREIGN PATENT DOCUMENTS

CN    109977689 A  *  7/2019  ......... G06F 21/6218

OTHER PUBLICATIONS

Final Office Action, U.S. Appl. No. 15/995,123, dated Apr. 22, 2020, 8 pages.
(Continued)

*Primary Examiner* — Shawnchoy Rahman
(74) *Attorney, Agent, or Firm* — Nicholson, De Vos, Webster & Elliott, LLP

(57) ABSTRACT

A method by a security system implemented by one or more electronic for detecting attacks on one or more databases. The method includes analyzing database logs of one or more databases to determine transaction characteristics of each of the one or more databases, selecting, for each of a plurality of database accesses to the one or more databases, one or more security rules to apply to that database access, wherein different security rules are selected for different ones of the plurality of database accesses depending on the determined transaction characteristics of the database being accessed, and causing, for each of the plurality of database accesses, the one or more security rules selected for that database access to be applied to that database access.

20 Claims, 9 Drawing Sheets

---

Analyze database logs of one or more databases to determine transaction characteristics of each of the one or more databases (210A)

↓

For each of a plurality of database access to the one or more databases, select one or more security rules to apply to that database access, where different security rules are selected for different ones of the database accesses depending on the determined transaction characteristics of the database being accessed (220A)

↓

For each of the plurality of database access, causing the one or more security rules selected for that database access to be applied to that database access (230A)

Related U.S. Application Data

(60) Provisional application No. 62/654,490, filed on Apr. 8, 2018.

(56) References Cited

U.S. PATENT DOCUMENTS

| | | | |
|---|---|---|---|
| 2002/0161905 A1* | 10/2002 | Haverinen | H04L 63/164 |
| | | | 709/229 |
| 2003/0115111 A1* | 6/2003 | Fisher | G06Q 30/08 |
| | | | 705/26.8 |
| 2005/0268117 A1 | 12/2005 | Simon | |
| 2007/0156659 A1 | 7/2007 | Lim | |
| 2007/0204346 A1 | 8/2007 | Meier | |
| 2009/0199273 A1 | 8/2009 | Yalamanchi | |
| 2012/0317129 A1 | 12/2012 | Qayyum et al. | |
| 2014/0108251 A1 | 4/2014 | Anderson et al. | |
| 2017/0200011 A1 | 7/2017 | Lin | |
| 2017/0237771 A1 | 8/2017 | Miroshnikov et al. | |

OTHER PUBLICATIONS

Kirkgoze, Remzi, et al. "A security concept for OLAP." Database and Expert Systems Applications. 8th International Conference, DEXA'97. Proceedings. IEEE, 1997. (Year: 1997).

Non-Final Office Action, U.S. Appl. No. 15/995,123, dated Jan. 9, 2020, 10 pages.

Notice of Allowance, U.S. Appl. No. 15/995,123, dated Jun. 11, 2020, 11 pages.

\* cited by examiner

DETECTING ATTACKS ON DATABASES BASED ON TRANSACTION CHARACTERISTICS DETERMINED FROM ANALYZING DATABASE LOGS

CROSS-REFERENCE TO RELATED APPLICATIONS

This application is a continuation of application Ser. No. 15/995,123, filed May 31, 2018, (now U.S. Pat. No. 10,803,192, issued Oct. 13, 2020), which claims the benefit of U.S. Provisional Application No. 62/654,490, filed Apr. 8, 2018, which are hereby incorporated by reference.

TECHNICAL FIELD

Embodiments of the invention relate to the field of database security, and more specifically, to detecting attacks on databases based on transaction characteristics determined from analyzing database logs.

BACKGROUND ART

Database servers are computer programs that provide database services to other computer programs, which are typically running on other electronic devices and adhering to the client-server model of communication. Many web applications utilize database servers (e.g., relational databases to store information received from Hypertext Transfer Protocol (HTTP) clients and/or information to be displayed to HTTP clients). However, other non-web applications may also utilize database servers, including but not limited to accounting software, other business software, or research software. Further, some applications allow for users to perform ad-hoc or defined queries (often using Structured Query Language (SQL)) using the database server. Database servers typically store data using one or more databases. Thus, in some instances a database server can receive a SQL query from a client (directly from a database client process or client end station using a database protocol, or indirectly via a web application server that a web server client is interacting with), execute the SQL query using data stored in the set of one or more database objects of one or more of the databases, and may potentially return a result (e.g., an indication of success, a value, one or more tuples, etc.).

Databases may be implemented according to a variety of different database models, such as relational (such as PostgreSQL, MySQL, and certain Oracle product), non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database objects that are managed by a Database Management System (DBMS), each database object may include a number of records, and each record may comprise of a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In a cloud database (a database that runs on a cloud platform and that is provided as a database service), identifiers are used instead of database keys, and relationships are used instead of foreign keys. In the case of relational databases, each database typically includes one or more database tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column.

Database security tools typically implement various security rules to protect databases. These security rules attempt to distinguish between legitimate database activities and suspicious database activities. The manner in which different databases are accessed may be different depending on, for example, the purpose of the database and the content of the database. For example, an Online Transactional Processing (OLTP) database may be accessed differently from an Online Analytical Processing (OLAP) database. OLTP databases are databases that support transaction-oriented applications. OLTP databases are typically used for order entry, financial transactions, customer relationship management (CRM), and retail sales. OLTP databases typically have a large number of short transactions. The database queries to these databases are usually simple, require sub-second response times, and return relatively few records. Online Analytical Processing (OLAP) databases are databases that support data analysis. OLAP databases are typically used for data mining and/or the discovery of previously unidentified relationships between data items. OLAP databases typically have a relatively low number of complex transactions. The database queries for these databases are usually complex and have long response times.

Conventional database security tools typically use the same set of security rules for all databases within its protection. However, this "one size-fits all" approach can be ineffective since different types of database activities can be considered suspicious in one database but considered normal in another database due to the difference in the manner in which the different databases are expected to be accessed.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
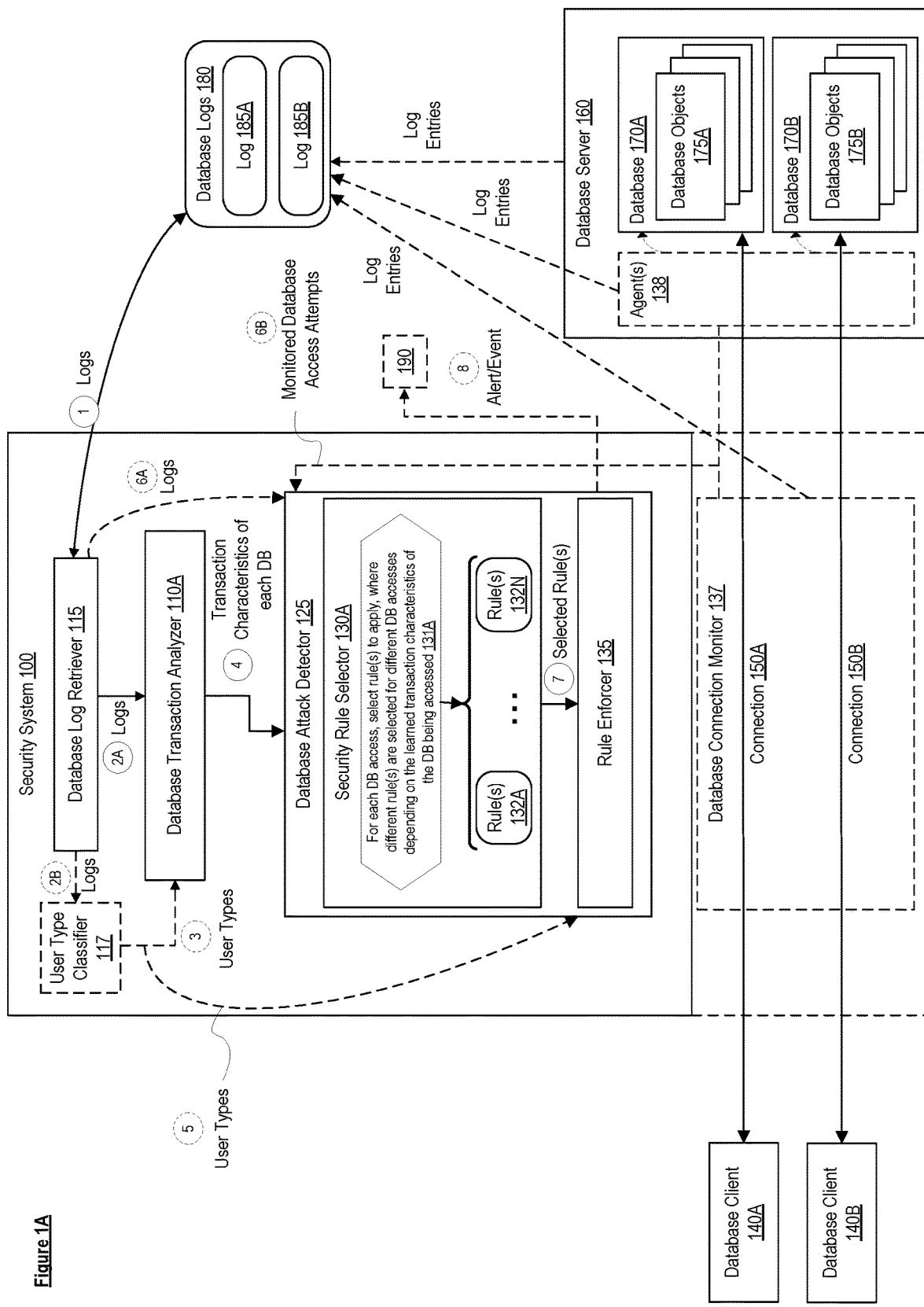
FIG. 1A is a block diagram illustrating a system for detecting attacks on databases based on transaction characteristics, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Various embodiments are described herein for detecting attacks on databases based on the transaction characteristics of those databases determined from analyzing database logs. Embodiments may apply different security rule(s) (sometimes referred to herein simply as "rule(s)") to different database accesses depending on the transaction characteristics of the database being accessed. This may result in a more accurate identification of suspicious database activities (e.g., attacks) and/or reduce the number of false positives compared to conventional approaches such as the "one size fits all" approach mentioned above.

While embodiments may use one or more databases implemented according to one or more of the different database models previously described, a relational database with tables is sometimes described to simplify understanding. In the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record are defined by the structure of the database object to which it belongs.

FIG. 1A is a block diagram illustrating a system for detecting attacks on databases based on the transaction characteristics, according to some embodiments. As shown in the diagram, the system includes database clients 140A and 140B, a security system 100, and a database server 160. The database server 160 can host one or more databases 170. In this example, the database server 160 hosts databases 170A and 170B. Each database 170 includes one or more database objects 175. In this example, database 170A includes database objects 175A and database 170B includes database objects 175B. In one embodiment, the database server 160 includes a database agent(s) 138, which is described in further detail below. As previously mentioned, databases may be implemented according to a variety of different models (e.g., relational, non-relational, graph, columnar, object, tabular, tuple store, and multi-model). In an embodiment where the databases 170 are relational databases, the database objects 175 may be database tables. However, in embodiments where the databases 170 are implemented according to a different model (non-relational model), the database objects 175 may be implemented using a different storage scheme.

Database clients 140 may establish connections 150 to one or more databases 170 to access those databases 170. For example, as shown in the diagram, database client 140A has established a connection 150A to database 170A, while database client 140B has established a connection 150B to database 175B. Each database client 140 can access a database 170 by submitting commands (e.g., Structured Query Language (SQL) queries) to the database server 160 over a connection 150 established with that database 170. These commands could include, for example, commands to read one or more records from a specified database object 175, modify the records of a specified database object 175, and/or delete records from a specified database object 175.

In one embodiment, the database server 160 generates and stores database logs 180. The database logs 180 are composed of log entries that record the transactions made against the databases 170 (e.g., as a result of interactions between the database clients 140 and the databases 170), which can include the request/query and/or the response/query result side of the transactions. In one embodiment, the database logs 180 are stored in the database server 160 (or near the database server 160), while in other embodiments, the database logs 180 are stored separately from the database server 160. In the example shown in the diagram, the database server 160 generates separate database logs 185 for each database 170 (database log 185A for database 170A and database log 185B for database 170B).

The security system 100 includes a database log retriever 115 (also referred to as a database log collector), a database transaction analyzer 110A, and a database attack detector 125. In one embodiment, the security system 100 further includes a user type classifier 117 and a database connection monitor 137. The database connection monitor 137 is configured to monitor the connections 150 established between the database clients 140 and the database server 160. In one embodiment, the database connection monitor 137 is implemented within a security gateway that sits inline between the database clients 140 and the database server 160 (on the communication path between the database clients 140 and the database server 160). In other embodiments, the database connection monitor 137 taps into (or "sniffs") the communication between the database clients 140 and the database server 160 without sitting inline. Thus, accesses to the databases 170 can be thought of as being "protected" or "monitored" by the database connection monitor 137, as most (or all) interactions with the databases 170 will pass through or otherwise be seen by the database connection monitor 137. As previously mentioned, the database server 160 may include a database agent(s) 138. The database agent(s) 138 (sometimes referred to simply as "agent(s)") is a piece of software typically installed locally to the databases 170 that is configured to monitor processes of the databases 170 (and thus able to monitor accesses to the databases 170). Thus, access to the databases 170 can be thought of as being "protected" or "monitored" by the agent(s) 138, as most (or all) interactions with the databases 170 may pass through or otherwise be seen by the agent(s) 138. While the diagram shows a single agent 138 that monitors accesses to both databases 170A and 170B, in other embodiments, each database 170 may have a separate agent 138 that monitors accesses to that database 170. In one embodiment, there is a separate agent 138 for each database vendor type (e.g., separate agents 138 for Oracle databases, MySQL databases, and Mongo databases). While the diagram shows the agent(s) 138 as being implemented inside the database server 160, in other embodiments, the agent(s) may be implemented outside of the database server 160. The agents(s) 138 may have a link to the database processes as indicated by the arrows extending from the database agent(s) 138 to the respective databases 170, which allow the agent(s) 138 to monitor accesses to the databases 170. In one embodiment, the database connection monitor 137 and/or the agent(s) 138 generates log entries that record the transactions it has seen made against the databases 170 and/or the interactions between the database clients 140 and the database server 160 it has seen and stores these as part of database logs 180. Thus, the database logs 180 can be generated by any combination of the database server 160, the database connection monitor 137, and the agent(s) 138. These database logs 180 can include various parameters and other information regarding the transactions made against the databases 170 and/or the interactions between the database clients 140 and the databases 170. As used herein, a "database transaction" or a "transaction" refers to a unit of work performed against a database 170 (e.g., this can include reading a record, inserting a record, deleting a record, etc.). The term "database transaction" or "transaction" is not limited to a particular type of database model, but can include accesses to databases utilizing various different database models previously described. Also, different embodiments of the systems described herein may operate on one or both of the request/query side and the response/query result side of the database transactions.

Exemplary operations for detecting attacks on databases based on the transaction characteristics of those databases will now be described with reference to the diagram. At circle 1, the database log retriever 115 retrieves the database logs 180 (which could include various parameters and information collected by the database server 160, the database connection monitor 137, and/or the agent(s) 138). In one embodiment, the database log retriever 115 requests the database logs 180 from the entity that hosts the database logs 180 (e.g., the database server 160 or a file server), while in another embodiment, the database logs 180 are "pushed" to the database log retriever 115 (e.g., periodically or as new logs become available).

At circle 2A, the database log retriever 115 provides the logs to the database transaction analyzer 110A. The database transaction analyzer 110A analyzes the logs to determine the transaction characteristics of each database 170. As will be described in further detail with reference to FIG. 1B, in one embodiment, the transaction characteristics include convergence information (e.g., whether the number of new users accessing a database 170 converges over time and/or whether the number of new database objects 175 in a database 170 being accessed by interactive users converges over time) (also referred to as indications of convergence or convergence indicators). As will be in further detail with reference to FIG. 1C, in one embodiment, the transaction characteristics include database type (e.g., whether a database is an Online Transactional Processing (OLTP) type database or an Online Analytical Processing (OLAP) type database). The database transaction analyzer 110A may be able to determine the transaction characteristics of databases 170 more accurately if it has a longer transaction history for the databases 170. Thus, the database transaction analyzer 110A may analyze log entries that cover a relatively long period of time (e.g., past 60 days).

In one embodiment, at circle 2B, the database log retriever 115 also provides the logs to the user type classifier 117. The user type classifier 117 analyzes the logs to classify a user accessing a database 170 as being an interactive user or a non-interactive user (e.g., an application). As used herein, an interactive user refers to a user that accesses a database 170 using commands/queries that are defined/formed ad-hoc by a human user (such queries are sometimes referred to as user generated queries or non-application generated queries). A non-interactive user is a user that accesses a database 170 using predefined commands/queries (e.g., defined/formed by a business application). In one embodiment, the user type classifier 117 may identify/define a user in the logs using a tuple of operating system (OS) name, source host name (e.g., the name of the source computer), and source application (e.g., the client application used to access the database 170). The user type classifier 117 may classify a user as being an interactive user or a non-interactive user based on a variety of factors such as, but not limited to, the name of the client application that is being used to access the database 170, the driver being used to connect to the database 170, the types of commands/queries that are being submitted by the user to the database 170, the amount of data being sent over the connection 150, and/or the frequency of queries being submitted to the database 170. The user type classifier 117 may be able to determine the user types more accurately if it has a longer transaction history (e.g., an audit history) for the databases 170. Thus, similar to the database transaction analyzer 110A, the user type classifier 117 may analyze log entries that cover a relatively long period of time (e.g., last 60 days).

At circle 3, the user type classifier 117 may provide the determined user types to the database transaction analyzer 110A. The database transaction analyzer 110A may use this information as part of determining the transaction characteristics (e.g., convergence information and/or database type) of the databases 170.

At circle 4, the database transaction analyzer 110A provides the determined transaction characteristics for each database 170 to the database attack detector 125. In one embodiment, at circle 5, the user type classifier 117 provides the determined user types to the database attack detector 125. The database attack detector 125 (and more specifically the rule enforcer 135) may use the determined user types to enforce rules that require knowing user type (an example of such a rule could be a rule to generate an alert/event every time an interactive user accesses a database object 175).

In one embodiment, at circle 6A, the database log retriever 115 provides logs to the database attack detector 125. These logs are the logs that the database attack detector 125 is to inspect for attacks and they generally cover a relatively short period of time (e.g., last 24 hours) compared to the logs that are analyzed by the database transaction analyzer 110A (and the user type classifier 117), which cover a relatively long period of time (e.g., last 60 days). Additionally or alternatively, at circle 6B, the database connection monitor 137 and/or the agent(s) 138 provides monitored database access attempts to the database attack detector 125. The database attack detector 125 may inspect these database access attempts (or other information collected by the database attack detector 125 and/or the agent(s) 138) for attacks. Thus, depending on the implementation, the database attack detector 125 may detect attacks by inspecting the logs provided by the database log retriever 115 and/or the database access attempts monitored by the database connection monitor 137 and/or the agent(s) 138.

The database attack detector 125 includes a security rule selector 130A and a rule enforcer 135. At block 131A, the security rule selector 130A selects, for each database access (seen in the logs and/or the monitored database access attempts), one or more rule(s) (e.g., from rule(s) 132A-N) to apply to that database access, where different rule(s) are selected for different ones of the database accesses depending on the learned transaction characteristics of the database being accessed. For example, if database 175A and database 175B have been determined (e.g., by the database transaction analyzer 110A) to have different transaction characteristics, then the security rule selector 130A may select different rule(s) to apply to database accesses to database 170A and database accesses to database 170B. At circle 7, the security rule selector 130A provides the selected rule(s) (or an indication of the selected rule(s)) to the rule enforcer 135 and the rule enforcer 135 enforces the selected rule(s) for each database access, which may cause, at circle 8, the database attack detector 125 to generate an alert/event to be sent to an entity 190, which in some embodiments can be an administrator, a storage location that stores generated alerts/events, and/or an alert/event analytics tool that performs further analysis on the generated alerts/events. In one embodiment, the alert/event analytics tool correlates various alerts/events to gain a more comprehensive view of suspicious database activities. In some embodiments, the rule enforcer 135 needs to enforce a rule that requires knowing the user types. In this case, the rule enforcer 135 can use the user types provided by the user type classifier 117 (at circle 5) to determine the user types when enforcing the rule(s). More specific implementations of the system are shown and described with reference to FIG. 1B and FIG. 1C.

Figure 1B:
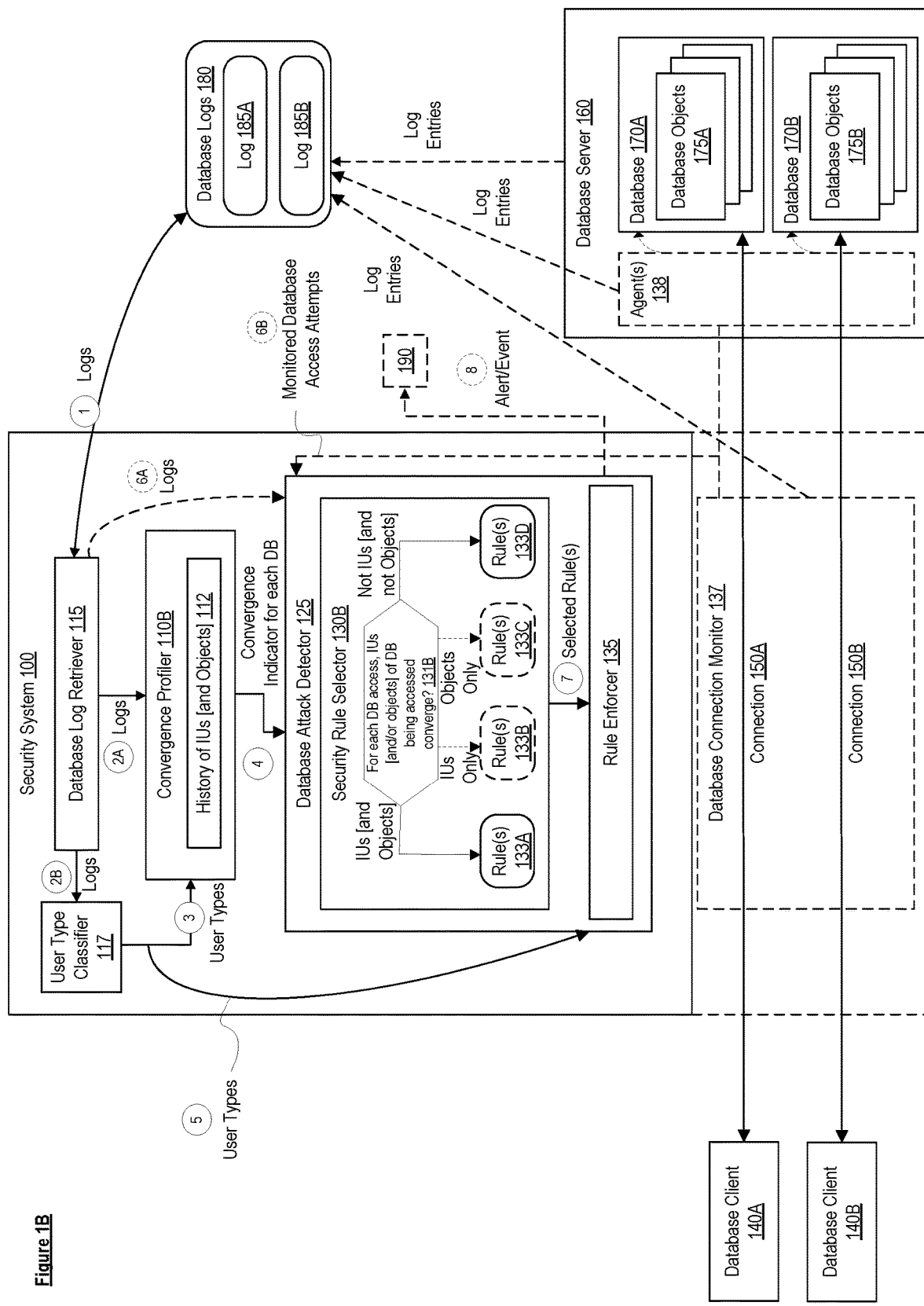
FIG. 1B is a block diagram illustrating a system for detecting attacks on databases based on convergence, according to some embodiments.

FIG. 1B is a block diagram illustrating a system for detecting attacks on databases based on convergence, according to some embodiments. The system is a specific implementation of the system shown and described with reference to FIG. 1A. As such, several aspects of the system shown in FIG. 1B are similar to those in the system shown in FIG. 1A, and the descriptions of those aspects are not repeated here for the sake of conciseness. In this embodiment, the database transaction analyzer 110A is a convergence profiler 110B. The convergence profiler 110B analyzes the logs (e.g., received at circle 2A) to determine whether the number of new interactive users accessing each of the databases 170 converges. In one embodiment, the convergence profiler 110B may also analyze the logs to determine whether the number of new database objects 175 (and more specifically application database objects, as opposed to system database objects that hold the metadata of the database 170) in each of the databases 170 being accessed by interactive users converges. For this purpose, the convergence profiler 110B keeps track of the history of interactive users that have accessed the databases 170 and optionally the history of database objects 175 accessed by interactive users (history of interactive users (IUs) and database objects 112). For example, the convergence profiler 110B may keep track of the interactive users that have been seen accessing each database 170 over a period of time (e.g., from inspecting the logs). If an interactive user that has not been seen in the past N days accesses a database 170, then that interactive user is considered a new interactive user. The convergence profiler 110B may determine that the number of new interactive users accessing a database 170 converges if the number of new interactive users seen each day remains consistent (e.g., within a certain range). Similarly, the convergence profiler 110B may also keep track of the history of database objects 175 being accessed by interactive users in a database 170 over a period of time. If a database object 175 that has not been accessed by an interactive user in the past N days is accessed by an interactive user, then that database object 175 is considered a new database object 175. The convergence profiler 110B may determine that the number of new database objects 175 in a database 170 converges if the number of new database objects 175 of the database 170 seen each day being accessed by interactive users remains consistent (e.g., within a certain range). The convergence profiler 110B can use the user types provided by the user type classifier 117 at circle 3 to determine which users are interactive users and which users are non-interactive users. At circle 4, the convergence profiler 110B provides a convergence indicator for each database 170 to the database attack detector 125. The convergence indicator for a database 170 may indicate whether the number of new interactive users accessing the database 170 converges and/or whether the number of new database objects 175 in the database 170 being accessed by interactive users converges.

The database attack detector 125 inspects the logs provided by the database log retriever 115 (e.g., at circle 6A) and/or the monitored database access provided by the database connection monitor 137 and/or the agent(s) 138 (e.g., at circle 6B) to detect attacks on the databases 170. At block 131B, the security rule selector 130B selects, for each database access (seen in the logs and/or the monitored database access attempts), one or more rule(s) to apply to that database access based on whether the number of new interactive users in the database 170 being accessed converges and optionally whether the number of new database objects 175 being accessed by interactive users in the database 170 being accessed converges (e.g., as indicated by the convergence indicators received at circle 4). For example, if the number of new interactive users converges (or if both converge), then the security rule selector 130B selects rule 133A, which may be a rule to generate an alert/event every time an interactive user accesses a database object 175 (an application database object) in the database 170 (e.g., this may indicate that the database is more likely to be an OLTP type database, but even if this is not the case, the number of alerts/events will not be high so we can keep alerting). If the number of new interactive users does not converge (and the number of new database objects 175 being accessed by interactive users does not converge), then the security rule selector 130B selects rule 133D, which may be a rule not to generate an alert/event when an interactive user accesses a database object 175 in the database 170 (e.g., this may indicate that the database is more likely to be an OLAP type database, but even if this is not the case, the database is likely not a production OLTP type database (it is for testing) so alerts may not be necessary). If the number of new interactive users converges but the number of new database objects 175 being accessed by interactive users does not converge, then the security rule selector 130B selects rule 133B, which may be a rule to only generate an alert/event the first time a given database object 175 in the database 170 is accessed by an interactive user (e.g., this may indicate that the database may be an OLTP type database, but even if this is not the case, the noise (created by alerts/events) will be reduced). Finally, if the number of new database objects 175 being accessed by interactive users converges, but the number of new interactive users does not converge, then the security rule selector 130B selects rule 133C, which may be a rule to only generate an alert/event the first time a given interactive user accesses a database object 175 in the database 170 (e.g., this may indicate that the database may be an OLAP type database, but even if this is not the case, the noise (created by alerts/events) will be reduced). At circle 7, the security rule selector 130B provides the selected rule(s) (or an indication of the selected rule(s)) to the rule enforcer 135 and the rule enforcer 135 enforces the selected rule(s) for each database access, which may cause, at circle 8, the database attack detector 125 to generate an alert/event to be sent to the entity 190 (e.g., an administrator, a storage location, and/or an alert/event analytics tool). The rule enforcer 135 may use the user types provided by the user type classifier 117 (e.g., at circle 5) to determine which users are interactive users and which users are non-interactive users when enforcing the rule(s).

Figure 1C:
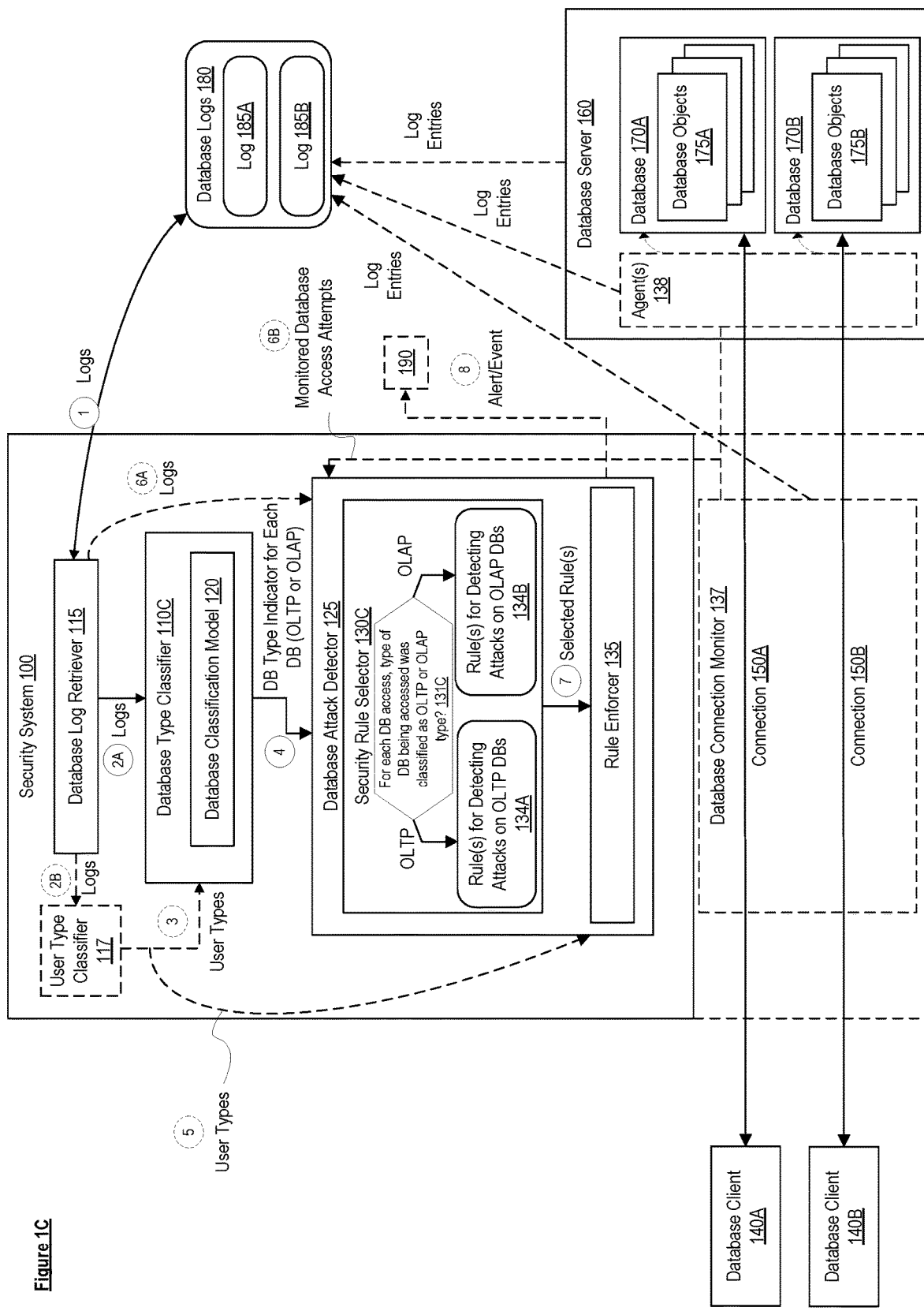
FIG. 1C is a block diagram illustrating a system for detecting attacks on databases based on database type, according to some embodiments.

FIG. 1C is a block diagram illustrating a system for detecting attacks on databases based on database type, according to some embodiments. The system is another specific implementation of the system shown and described with reference to FIG. 1A. As such, several aspects of the system shown in FIG. 1C are similar to those in the system shown in FIG. 1A, and the description of those aspects are not repeated here for the sake of conciseness. In this embodiment, the database transaction analyzer 110A is a database type classifier 110C. The database type classifier 110C analyzes the logs (e.g., received at circle 2A) to classify each of the databases 170 as being an OLTP type database or an OLAP type database. For this purpose, the database type classifier 110C includes a database classification model 120 that has been trained using machine learning to classify a database as being an OLTP type database or an OLAP type database. The database classification model 120 may use a variety of factors to classify a database 170. For example, the database classification model 120 may classify a database 170 using one or more of the features shown in Table I.

TABLE I

| Feature Family | Feature | Example |
| --- | --- | --- |
| (1) Access Tool Distribution | Portion of specific tools | Significant presence of business intelligence (BI) tools or extract, transform, and load (ETL) processes hint at OLAP |
| (2) Query operation distribution | Portion of different operations | Significant portion of UPDATE and DELETE operations hint at OLTP; Significant portion of INSERT and READ operations hint at OLAP |
| (3) Distribution of the number of operations per user | Statistical measures (e.g., average, percentiles, etc.) on the distribution of the number of operations per user | Large number of queries hint at OLAP |
| (4) Distribution of query response times | Statistical measures (e.g., min, max, average, percentile, etc.) on the distribution of the number of operations per user | Long response times hint at OLAP (real-time databases need to respond quickly) |
| (5) Distribution of user types | Portion of specific user types (e.g., interactive users vs. non-interactive users) | Large portion of users being interactive users (accessing the database directly) hints at OLAP |
| (6) User concurrency distribution | Statistical measures (e.g., min, max, percentile, etc.) user concurrency - how many users are accessing database within a given time frame (e.g., an hour) | Large number of concurrent on interactive users within a given time frame hint at OLAP |
| (7) Textual hints | Existence of database object names that contain certain keywords as substrings | Keywords "dim" and "fact" in database object names hint at OLAP |

The database type classifier 110C can use the user types provided by the user type classifier 117 at circle 3 to determine which users are interactive users and which users are non-interactive users (e.g., this may be useful for item (5) in Table I). At circle 4, the database type classifier 110C provides a database type indicator for each database 170 (e.g., indicating whether each database 170 has been determined to be an OLTP type database or an OLAP type database) to the database attack detector 125.

The database attack detector 125 inspects the logs provided by the database log retriever 115 (e.g., at circle 6A) and/or the monitored database access provided by the database connection monitor 137 and/or the agent(s) 138 (e.g., at circle 6B) to detect attacks on the databases 170. At block 131C, the security rule selector 130C selects, for each database access (seen in the logs and/or the monitored database access attempts), one or more rule(s) to apply to that database access based on whether the database being accessed has been classified as an OLTP type database or an OLAP type database (e.g., as indicated by the database type indicators received at circle 4). For example, if the database 170 has been classified as an OLTP type database, then the security rule selector 130C selects rule(s) 134A, which is a rule(s) for detecting attacks on OLTP type databases. In one embodiment, rule 134A (the rule for detecting attacks on OLTP type databases) is a rule to generate an alert/event every time an interactive user accesses a database object 175 in the database 170. If the database 170 has been classified as an OLAP type database, then the security rule selector 130C selects rule(s) 134B, which is a rule(s) for detecting attacks on OLAP type databases. In one embodiment, rule 134B (the rule for detecting attacks on OLAP type databases) is a rule not to generate an alert/event when an interactive user accesses a database object 175 in the database 170. At circle 7, the security rule selector 130C provides the selected rule(s) (or an indication of the selected rule(s)) to the rule enforcer 135 and the rule enforcer 135 enforces the selected rule(s) for each database access, which may cause, at circle 8, the database attack detector 125 to generate an alert/event to be sent to the entity 190 (e.g., an administrator, a storage location, and/or an alert/event analytics tool). In one embodiment, the rule enforcer 135 may use the user types provided by the user type classifier 117 (e.g., at circle 5) to determine which users are interactive users and which users are non-interactive users when enforcing the rules.

Figure 1D:
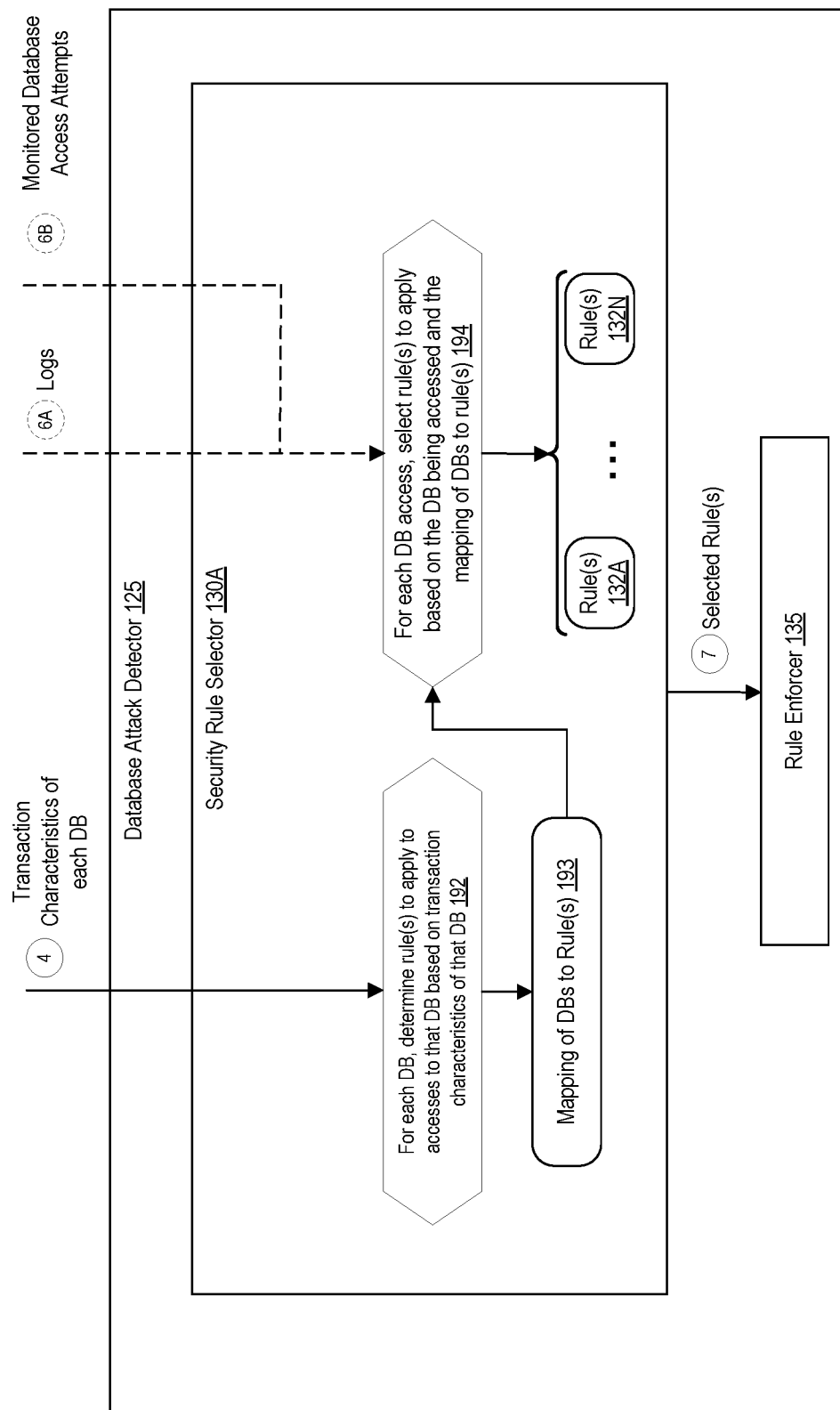
FIG. 1D is a block diagram illustrating a more detailed view of the operations of the database attack detector, according to some embodiments.

FIG. 1D is a block diagram illustrating a more detailed view of the operations of the database attack detector, according to some embodiments. As previously described, the database attack detector 125 includes a security rule selector 130A and a rule enforcer 135. At circle 4, the security rule selector 130A receives the transaction characteristics of each database 170 (e.g., provided by the database transaction analyzer 110A). At block 192, the security rule selector 130A determines, for each database 170, the rule(s) to apply to accesses to that database based on the transaction characteristics of that database. Based on the determinations made at block 192, the security rule selector 130A may generate a mapping of databases to rule(s) 193 that indicates the rule(s) corresponding to each database 170. The mapping of databases to rule(s) 193 can be stored in a data structure that allows for fast and efficient lookup (e.g., a hash table).

Subsequently, at circle 6A and/or circle 6B, the security rule selector 130A receives logs and/or monitored database access attempts that are to be inspected for attacks (e.g., the logs may be provided by the database log retriever 115 and the monitored database access attempts may be provided by the database connection monitor 137 and/or the agent(s) 138). At block 194, the security rule selector 130A selects, for each database access (indicated in the logs and/or the monitored database access attempts), the rule(s) to apply to that database access based on the database 170 being accessed and the mapping of databases to rule(s) 193. It should be noted that different rule(s) (e.g., from rule(s) 132A-132N) can be applied to different database accesses depending on the database being accessed, and more specifically, depending on the transaction characteristics of the database being accessed. At circle 7, the security rule selector 130A provides the selected rule(s) (or an indication of the selected rule(s)) to the rule enforcer 135 so that the rule enforcer 135 can apply the selected rule(s) to the database access (e.g., which may result in generating an alert/event).

It should be noted that security rule selector 130B (shown in FIG. 1B) and security rule selector 130C (shown in FIG. 1C) can operate in a similar manner as security rule selector 130A shown in this diagram. However, in those cases, the transaction characteristics would include convergence information (e.g., whether the number of new users accessing a database 170 converges over time and/or whether the number of new database objects 175 in a database 170 being accessed by interactive users converges over time) and database type (e.g., whether a database 170 is an OLTP type database or an OLAP type database), respectively.

One or more of the components of the security system 100 can be implemented by one or more electronic devices, and can be implemented using software, hardware, or a combination of both. In some embodiments, one or more components of the security system 100 can be implemented in an on-premise secure server (e.g., of the enterprise that hosts the database server 160) and/or a cloud. For example, the database log retriever 115, the database transaction analyzer 110A, the user type classifier 117, the database attack detector 125, or any combination thereof may be implemented in a cloud. While a certain configuration of the security system 100 is shown in the diagrams, it should be understood that the configuration is shown by way of example, and not intended to be limiting. Other embodiments may utilize a different configuration. For example, the database attack detector 125 can be implemented in a security gateway that sits between the database clients 140 and the database server 160, implemented as part of the database connection monitor 137, and/or implemented as part of the agent(s) 138. As another example, while the security rule selector 130 and the rule enforcer 135 are shown in the diagrams as being implemented as part of the database attack detector 125, in other embodiments, the security rule selector 130 and/or the rule enforcer 135 could be implemented separately from the database attack detector 125 (e.g., as a separate product from the database attack detector 125).

Figure 2A:
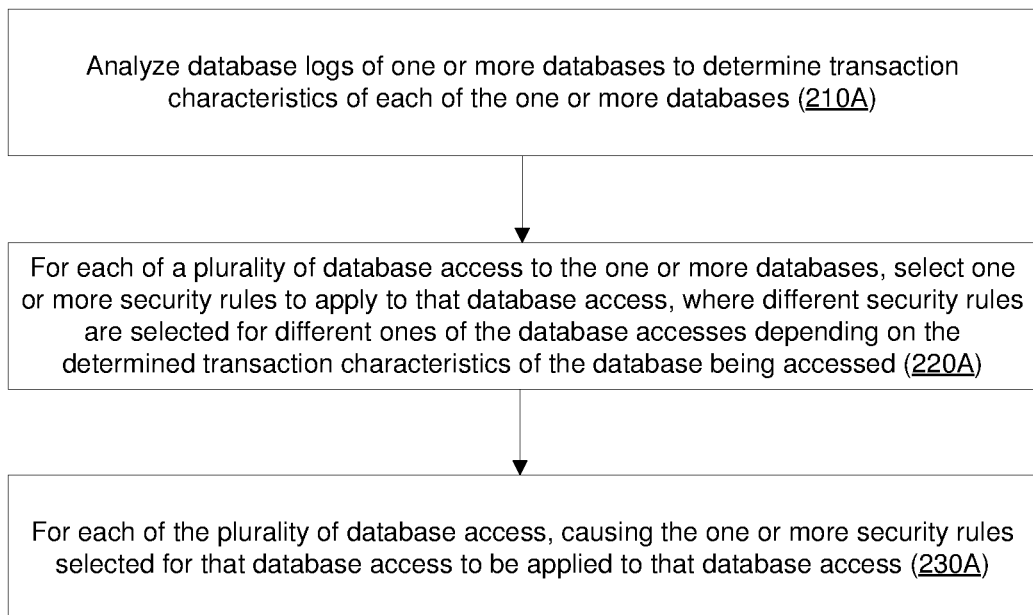
FIG. 2A is a flow diagram of a process for detecting attacks on databases based on transaction characteristics, according to some embodiments.

FIG. 2A is a flow diagram of a process for detecting attacks on databases based on transaction characteristics, according to some embodiments. In one embodiment, the process is implemented by components of a security system 100.

At block 210A, the security system 100 (e.g., the database transaction analyzer 110A of the security system 100) analyzes database logs of one or more databases to determine transaction characteristics of each of the one or more databases.

At block 220A, the security system 100 (e.g., the security rule selector 130A of the security system 100) selects, for each of a plurality of database access to the one or more databases, one or more security rules to apply to that database access, where different security rules are selected for different ones of the plurality of database accesses depending on the determined transaction characteristics of the database being accessed.

At block 230A, the security system 100 (e.g., the rule enforcer 135 of the security system 100) causes, for each of the plurality of database access, the one or more security rules selected for that database access to be applied to that database access.

Figure 2B:
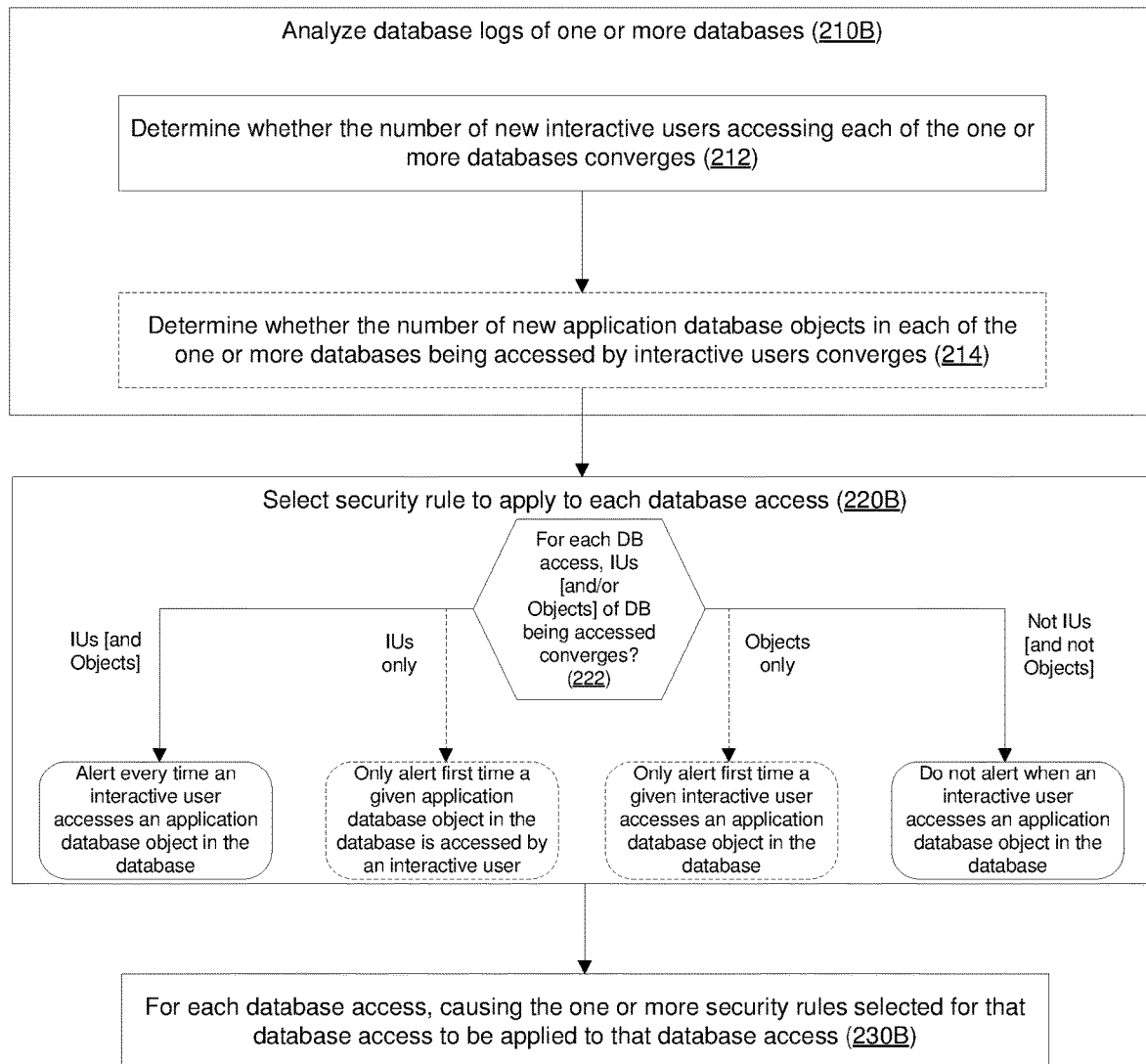
FIG. 2B is a flow diagram of a process for detecting attacks on databases based on convergence, according to some embodiments.

FIG. 2B is a flow diagram of a process for detecting attacks on databases based on convergence, according to some embodiments. The process is a more specific version of the process described with reference to the flow diagram shown in FIG. 2A, where the transaction characteristics include convergence information. In one embodiment, the process is implemented by components of a security system 100.

At block 210B, the security system 100 (e.g., the convergence profiler 110B of the security system 100) analyzes database logs of one or more databases to determine transaction characteristics (e.g., convergence information) of each of the one or more databases. This involves, at block 212, determining whether the number of new interactive users accessing each of the one or more databases converges. In one embodiment, analyzing the database logs also involves, at block 214, determining whether the number of new application database objects 175 in each of the one or more databases 170 being accessed by interactive users converges.

At block 220B, the security system 100 (e.g., the security rule selector 130B of the security system 100) selects, for each of a plurality of database access to the one or more databases, one or more security rules to apply to that database access, where different security rules are selected for different ones of the plurality of database accesses depending on the determined transaction characteristics of the database being accessed. This involves, at block 222, determining, for each database access, whether the number of new interactive users in the database 170 being accessed converges and optionally whether the number of new database objects 175 being accessed by interactive users in the database 170 being accessed converges. If the number of new interactive users converges (or if both the number of interactive users and the number of new database objects 175 converge), then the security system 100 selects a rule that generates an alert/event every time an interactive user accesses an application database object 175 in the database 170. If the number of new interactive user converges but the number of new application database objects being accessed by interactive users does not converge, then the security system 100 selects a rule that only generates an alert/event the first time a given application database object in the database 170 is accessed by an interactive user. If the number of new application database objects 175 accessed by interactive users converges but the number of interactive users does not converge, then the security system 100 selects a rule that only generates an alert/event the first time a given interactive user accesses an application database object 175 in the database 170. If the number of new interactive users does not converge (or if both the number of new interactive users and the number of new database objects 175 being accessed by interactive users do not converge), then the security system 100 selects a rule that does not generate an alert/event when an interactive user accesses an application database object 175 in the database 170.

At block 230B, the security system 100 (e.g., the rule enforcer 135 of the security system 100) causes, for each of the plurality of database access, the one or more security rules selected for that database access to be applied to that database access.

Figure 2C:
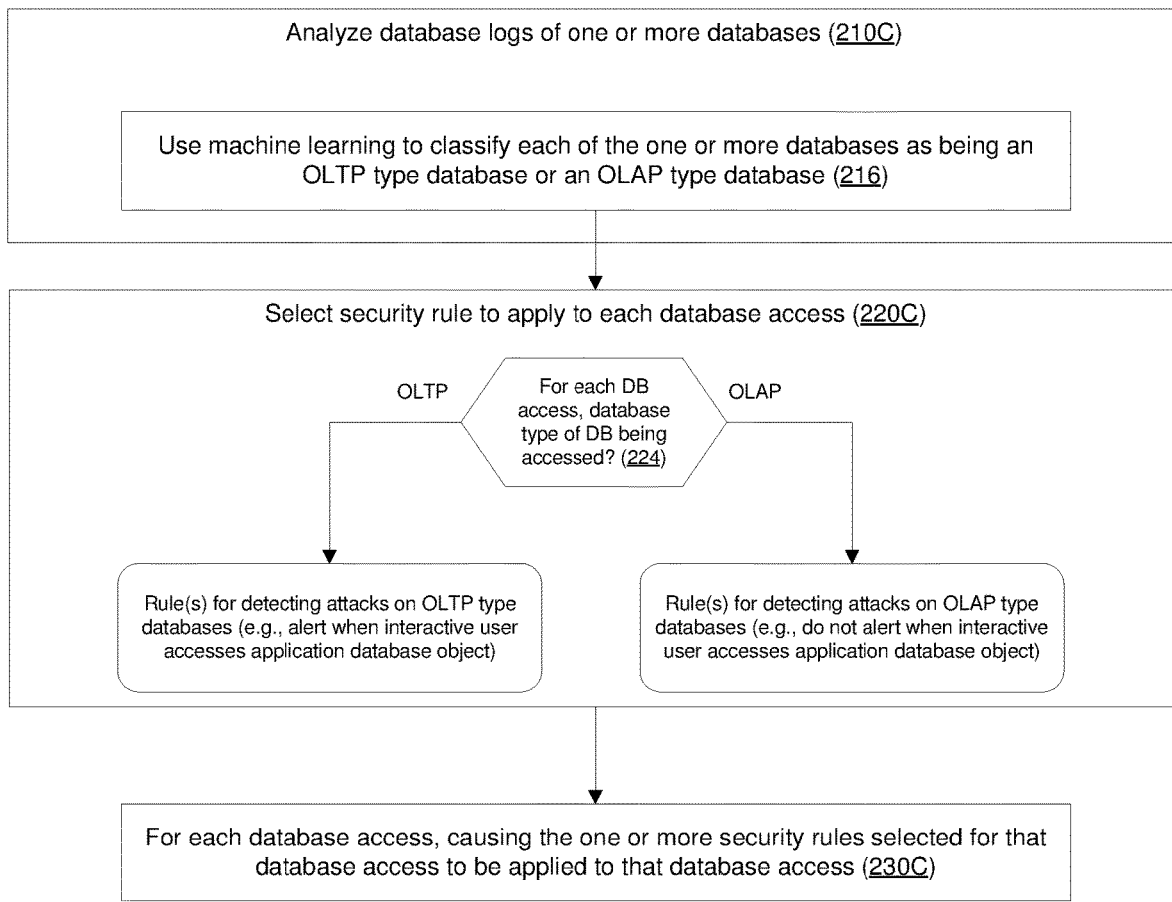
FIG. 2C is a flow diagram of a process for detecting attacks on databases based on database type, according to some embodiments.

FIG. 2C is a flow diagram of a process for detecting attacks on databases based on database type, according to some embodiments. The process is a more specific version of the process described with reference to the flow diagram shown in FIG. 2A, where the transaction characteristics include database type. In one embodiment, the process is implemented by components of a security system 100.

At block 210C, the security system 100 (e.g., the database type classifier 110C of the security system 100) analyzes database logs of one or more databases to determine transaction characteristics (e.g., database type) of each of the one or more databases. This involves, at block 216, using machine learning to classify each of the one or more databases as being an OLTP type database or an OLAP type database.

At block 220C, the security system 100 (e.g., the security rule selector 130C of the security system 100) selects, for each of a plurality of database access to the one or more databases, one or more security rules to apply to that database access, where different security rules are selected for different ones of the plurality of database accesses depending on the determined transaction characteristics of the database being accessed. This involves, at block 224, determining, for each database access, the database type of the database being accessed. If the database being accessed is an OLTP type database, then the security system 100 selects a rule for detecting attacks on OLTP type databases. In one embodiment, this can be a rule to generate an alert/event when an interactive user accesses an application database object 175. If the database being accessed is an OLAP type database, then the security system 100 selects a rule for detecting attacks on OLAP type databases. In one embodiment, this can be a rule not to generate an alert/event when an interactive user accesses an application database object 175.

At block 230C, the security system 100 (e.g., the rule enforcer 135 of the security system 100) causes, for each of the plurality of database access, the one or more security rules selected for that database access to be applied to that database access.

Figure 3:
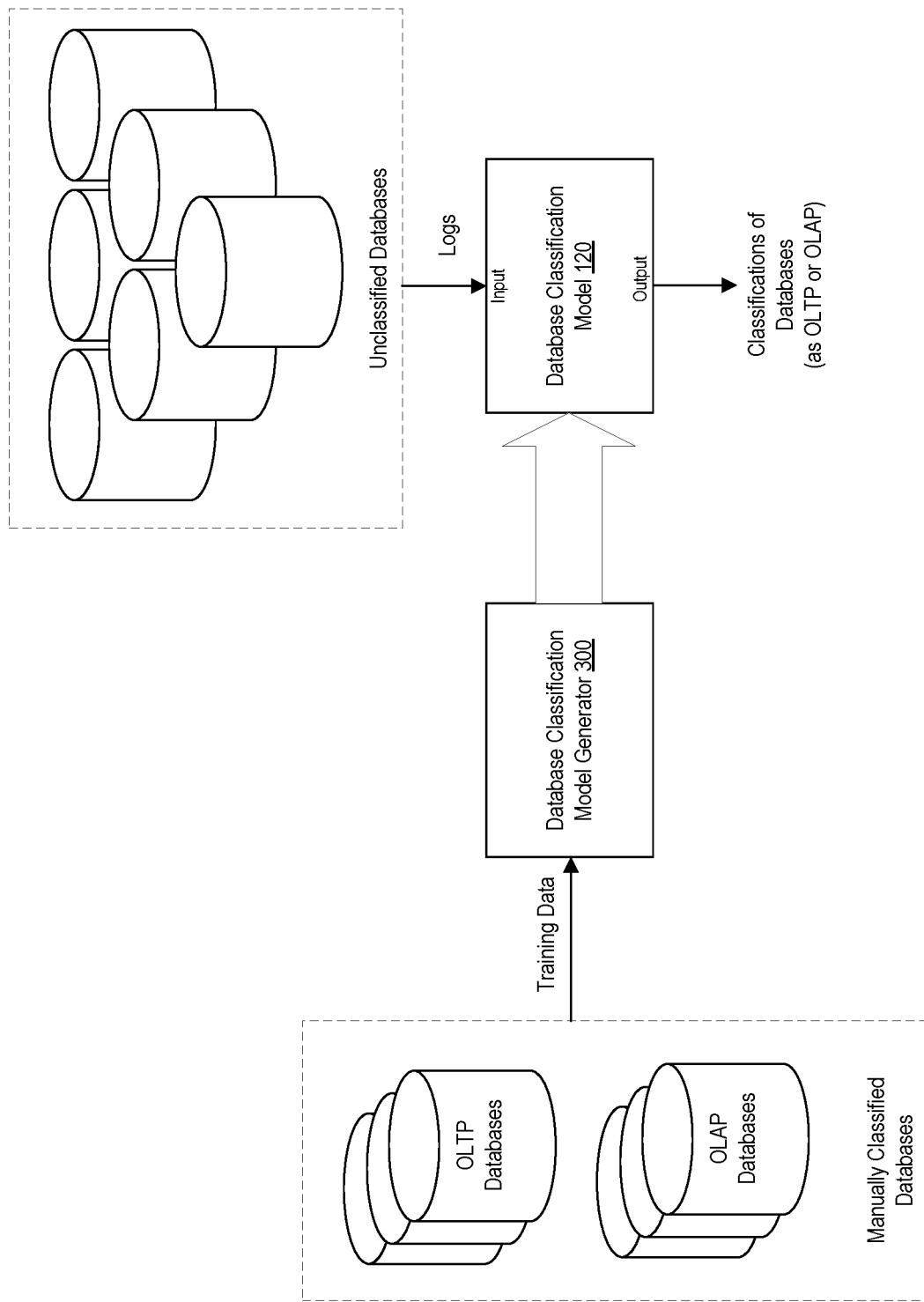
FIG. 3 is a block diagram illustrating a database classification model generator generating a database classification model, according to some embodiments.

FIG. 3 is a block diagram illustrating a database classification model generator generating a database classification model, according to some embodiments. As shown in the diagram, the database classification model generator 300 receives training data as input. The training data may include a list of manually classified databases (e.g., classified as being an OLTP type database or an OLAP type database), as well as various features of these databases (e.g., encoded as labeled feature vectors each representing the features of a given database 170). In one embodiment, the features include one or more of those listed in Table I. The database classification model generator 300 uses the training data to train and generate a database classification model 120. In one embodiment, the database classification model generator 300 uses a supervised machine learning algorithm (e.g., random forest tree or gradient boosting tree (e.g., using XGBoost)) to train the database classification model 120. The database classification model 120 may include a set of decision trees for deciding/classifying a database based on its features. The database classification model 120 can be used to classify databases 170. For example, the input to the database classification model 120 may be the database logs of unclassified databases and the output of the database classification model 120 may be the classifications of the databases (as an OLTP type database or an OLAP type database).

Figure 4:
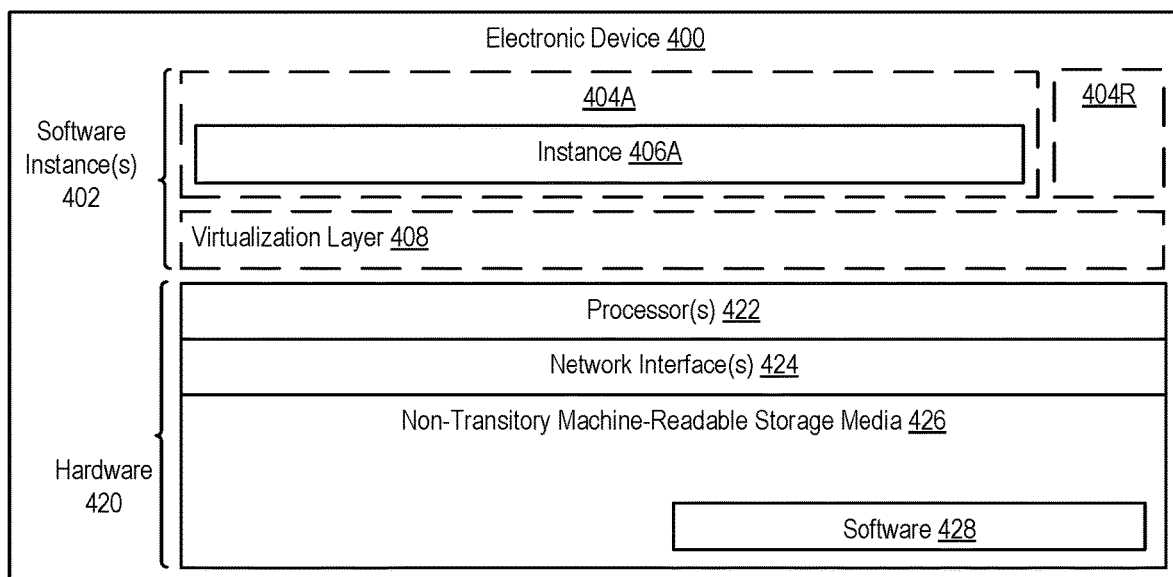
FIG. 4 is a block diagram illustrating an electronic device according to some example implementations.

FIG. 4 is a block diagram illustrating an electronic device, according to some embodiments. FIG. 4 includes hardware 420 comprising a set of one or more processor(s) 422, a set of one or more network interfaces 424 (wireless and/or wired), and non-transitory machine-readable storage media 426 having stored therein software 428 (which includes instructions executable by the set of one or more processor(s) 422). Software 428 can include code, which when executed by hardware 420, causes the electronic device 400 to perform operations of one or more embodiments described herein (e.g., the operations of one or more components of the security system 100).

In electronic devices that use compute virtualization, the set of one or more processor(s) 422 typically execute software to instantiate a virtualization layer 408 and software container(s) 404A-R (e.g., with operating system-level virtualization, the virtualization layer 408 represents the kernel of an operating system (or a shim executing on a base operating system) that allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 428 (illustrated as instance 406A) is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by a security system implemented by one or more electronic devices for detecting attacks on one or more databases:
    analyzing database logs of one or more databases to determine transaction characteristics of each of the one or more databases, wherein the database logs include records of transactions made against the one or more databases;
    selecting, for each of a plurality of database accesses made by database clients to the one or more databases, one or more security rules to apply to that database access, wherein different security rules are selected for different ones of the plurality of database accesses depending on the determined transaction characteristics of the database being accessed; and
    causing, for each of the plurality of database accesses, the one or more security rules selected for that database access to be applied to that database access.

2. The method of claim 1, wherein the determined transaction characteristics of each of the one or more databases include whether the number of new application database objects accessed by interactive users in each of the one or more databases converges over time.

3. The method of claim 2, wherein a first security rule is selected for database accesses that access a database for which it has been determined that the number of new application database objects accessed by interactive users in the database converges over time, wherein a second security rule is selected for database accesses that access a database for which it has been determined that the number of new application database objects accessed by interactive users in the database does not converge over time, wherein the first security rule is a rule to generate an alert every time an interactive user accesses an application database object and the second security rule is a rule to not generate an alert when an interactive user accesses an application database object.

4. The method of claim 2, wherein the number of new application database objects accessed by interactive users in a database is determined to converge over time if the number of new database objects of the database accessed by interactive users within a predefined time period stays within a predefined range, wherein a database object is considered as being a new database object if it has not been accessed by an interactive user within a most recent period of time.

5. The method of claim 2, further comprising:
analyzing the database logs of the one or more databases to classify users accessing the one or more databases as being interactive users or non-interactive users.

6. The method of claim 5, wherein the users are classified as being interactive users or non-interactive users based on one or more of a client application name, types of queries submitted, amount of data sent over a database connection, and frequency of queries sent over a database connection.

7. The method of claim 5, wherein the users are identified in the database logs using a combination of operating system name, source host name, and source application.

8. The method of claim 1, wherein the plurality of database accesses made by the database clients to the one or more databases is monitored by a database connection monitor or a database agent.

9. A set of one or more non-transitory computer readable storage media storing instructions which, when executed by one or more processors of one or more computing devices, cause the one or more computing devices to perform operations for detecting attacks on one or more databases, the operations comprising:
analyzing database logs of one or more databases to determine transaction characteristics of each of the one or more databases, wherein the database logs include records of transactions made against the one or more databases;
selecting, for each of a plurality of database accesses made by database clients to the one or more databases, one or more security rules to apply to that database access, wherein different security rules are selected for different ones of the plurality of database accesses depending on the determined transaction characteristics of the database being accessed; and
causing, for each of the plurality of database accesses, the one or more security rules selected for that database access to be applied to that database access.

10. The set of one or more non-transitory computer readable storage media of claim 9, wherein the determined transaction characteristics of each of the one or more databases include whether the number of new application database objects accessed by interactive users in each of the one or more databases converges over time.

11. The set of one or more non-transitory computer readable storage media of claim 10, wherein a first security rule is selected for database accesses that access a database for which it has been determined that the number of new application database objects accessed by interactive users in the database converges over time, wherein a second security rule is selected for database accesses that access a database for which it has been determined that the number of new application database objects accessed by interactive users in the database does not converge over time, wherein the first security rule is a rule to generate an alert every time an interactive user accesses an application database object and the second security rule is a rule to not generate an alert when an interactive user accesses an application database object.

12. The set of one or more non-transitory computer readable storage media of claim 10, wherein the number of new application database objects accessed by interactive users in a database is determined to converge over time if the number of new database objects of the database accessed by interactive users within a predefined time period stays within a predefined range, wherein a database object is considered as being a new database object if it has not been accessed by an interactive user within a most recent period of time.

13. The set of one or more non-transitory computer readable storage media of claim 10, wherein the operations further comprise:
analyzing the database logs of the one or more databases to classify users accessing the one or more databases as being interactive users or non-interactive users.

14. The set of one or more non-transitory computer readable storage media of claim 13, wherein the users are classified as being interactive users or non-interactive users based on one or more of a client application name, types of queries submitted, amount of data sent over a database connection, and frequency of queries sent over a database connection.

15. A computing device configured to detect attacks on one or more databases, the computing device comprising:
one or more processors; and
a non-transitory machine-readable storage medium having instructions stored therein, which when executed by the one or more processors, causes the computing device to:
analyze database logs of one or more databases to determine transaction characteristics of each of the one or more databases, wherein the database logs include records of transactions made against the one or more databases;
select, for each of a plurality of database accesses made by database clients to the one or more databases, one or more security rules to apply to that database access, wherein different security rules are selected for different ones of the plurality of database accesses depending on the determined transaction characteristics of the database being accessed; and
cause, for each of the plurality of database accesses, the one or more security rules selected for that database access to be applied to that database access.

16. The computing device of claim 15, wherein the determined transaction characteristics of each of the one or more databases include whether the number of new application database objects accessed by interactive users in each of the one or more databases converges over time.

17. The computing device of claim 16, wherein a first security rule is selected for database accesses that access a database for which it has been determined that the number of new application database objects accessed by interactive users in the database converges over time, wherein a second security rule is selected for database accesses that access a database for which it has been determined that the number of new application database objects accessed by interactive users in the database does not converge over time, wherein the first security rule is a rule to generate an alert every time an interactive user accesses an application database object and the second security rule is a rule to not generate an alert when an interactive user accesses an application database object.

18. The computing device of claim 16, wherein the number of new application database objects accessed by interactive users in a database is determined to converge over time if the number of new database objects of the database accessed by interactive users within a predefined time period stays within a predefined range, wherein a database object is considered as being a new database object if it has not been accessed by an interactive user within a most recent period of time.

19. The computing device of claim 16, wherein the non-transitory machine- readable storage medium has further instructions stored therein, which when executed by the one or more processors, causes the computing device to:
   analyze the database logs of the one or more databases to classify users accessing the one or more databases as being interactive users or non-interactive users.

20. The computing device of claim 19, wherein the users are classified as being interactive users or non-interactive users based on one or more of a client application name, types of queries submitted, amount of data sent over a database connection, and frequency of queries sent over a database connection.

* * * * *